United States Patent [19]

Rogers

[11] Patent Number: 4,460,197
[45] Date of Patent: Jul. 17, 1984

[54] FRONT END STEERING ASSEMBLY FOR CARTS AND THE LIKE

[76] Inventor: Garry W. C. Rogers, 402 Kirkfield St., Winnipeg, Manitoba, Canada, R3K 1E6

[21] Appl. No.: 345,427

[22] Filed: Feb. 3, 1982

[51] Int. Cl.³ .............................................. B62D 1/00
[52] U.S. Cl. ................................ 280/771; 74/579 R; 280/95 R; 280/779
[58] Field of Search .................... 280/771, 779, 93, 94, 280/95 R, 95 A; 74/579 R

[56] References Cited

U.S. PATENT DOCUMENTS

| | | | |
|---|---|---|---|
| 1,233,228 | 7/1917 | Harvey | 280/95 R |
| 1,468,448 | 9/1923 | Johnson | 280/94 |
| 1,537,198 | 5/1925 | Soldner | 280/771 |
| 1,764,730 | 6/1930 | Kraeft | 280/95 R |
| 2,806,712 | 9/1957 | Cottrell | 280/93 |
| 3,966,220 | 6/1976 | Forsyth | 280/771 |

*Primary Examiner*—Bruce H. Stoner, Jr.
*Assistant Examiner*—John A. Carroll

*Attorney, Agent, or Firm*—Stanley G. Ade

[57] ABSTRACT

A cross member includes a steering shaft support and mounts a ground engaging wheel at each end thereof via a component mounted at each end of the cross member for partial rotation about a vertical axis. A steering arm extends from this component which is adjustably clamped to the steering arm. A connecting rod extends from each steering arm to a centrally located pitman arm extending from the steering shaft which in turn is mounted on the steering shaft support. Preferably, one connecting rod freely hooks onto one steering arm and to the pitman arm with the other connecting rod being hooked to the other steering arm and to the first connecting rod. The angular relationship between the pitman arm, the connecting rods and the hooked ends of the steering arms causes the wheels to turn at different radii and the hooked connections provide the necessary up and down movement without excessive play or clearance thus eliminating the need for more expensive pivot type assemblies.

25 Claims, 4 Drawing Figures

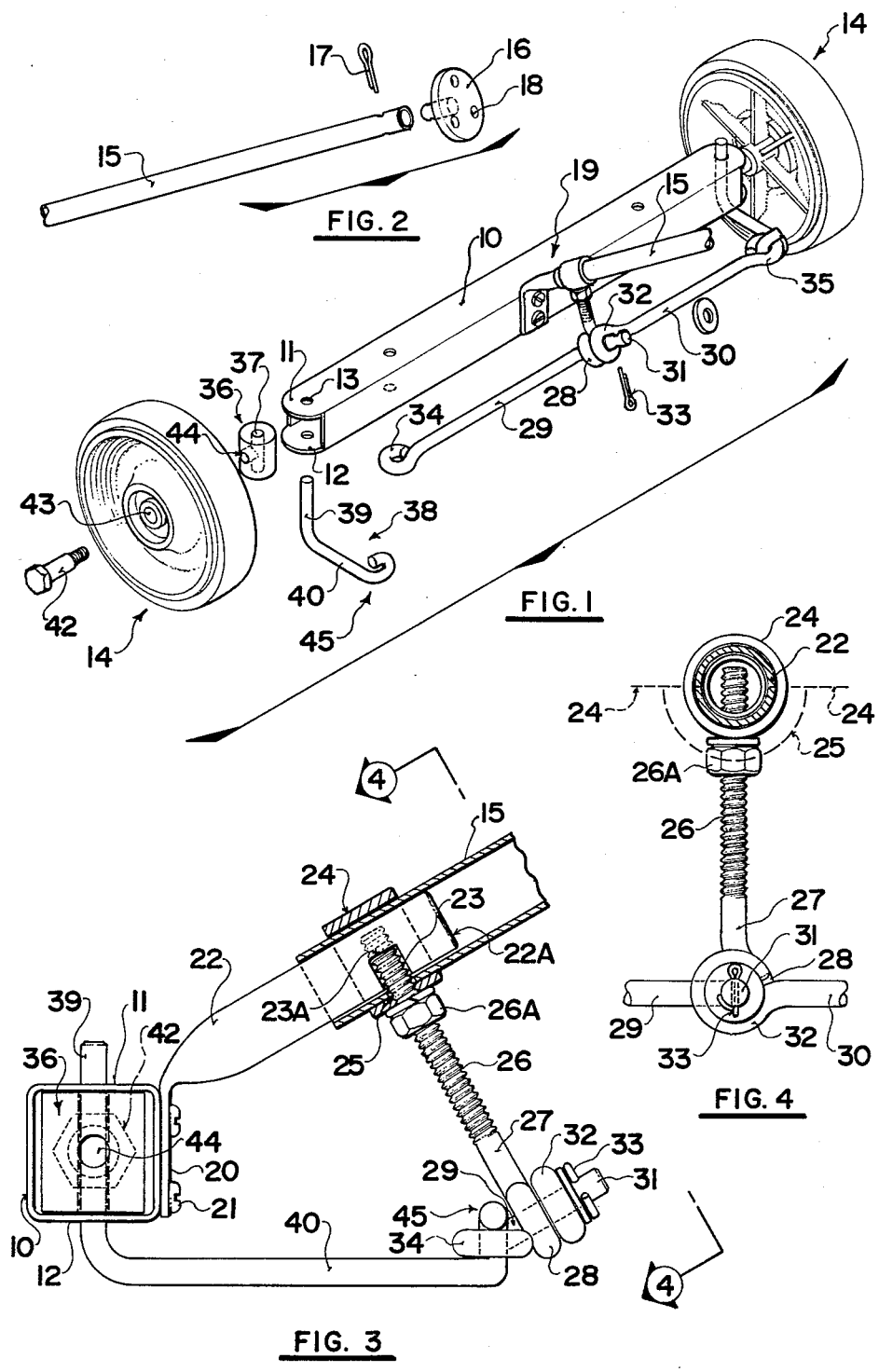

FRONT END STEERING ASSEMBLY FOR CARTS AND THE LIKE

BACKGROUND OF THE INVENTION

This invention relates to new and useful improvements in steering assembly for carts such as go-carts, soap derby carts and the like including steering for tongue type wagons.

Because of the competition existing with such carts, simple linkage steering is not satisfactory due primarily to the lack of safety thereo. At relatively high speeds, such conventional steering mechanisms can often lock in one direction or the other, can be difficult to turn and can readily fail during use.

While it is appreciated that relatively expensive and machined steering mechanism may be used, thus providing the necessary steering capability, nevertheless it will be appreciated that one of the attractions of such carts is the relatively low cost.

SUMMARY OF THE INVENTION

The present invention overcomes these disadvantages by providing a relatively simple construction which at the same time is safe in use and provides a steering capability eminently suitable for use with such carts inasmuch as the front wheel alignment is easily adjusted and fixed, the inner wheel turns slightly further than the outer wheel and which includes means to limit the turning action in both directions. Furthermore, the construction provides the necessary geometry for efficient steering action of such carts.

In accordance with the invention there is provided a front end steering assembly for carts and the like comprising in combination a transverse rod member, a ground engaging wheel mounted upon each end thereof, means to mount said wheels to said cross member, a steering arm operatively connected to each wheel and extending of said cross member, a connecting rod extending from each steering arm towards the centre of said cross member, a steering shaft, means mounting said steering shaft for axial rotation, substantially centrally of said cross member and extending upwardly and rearwardly therefrom at an inclined angle relative to the vertical and transverse horizontal axes of said cross member, a pitman arm connected to said steering shaft and extending downwardly therefrom normal to the axis thereof, means operatively connecting said connecting rods to said steering arms, and further means operatively connecting one connecting rod to the pitman arm and the other connecting rod to said one connecting rod.

Another advantage of the present invention is that it is eminently suited for sale as a kit thus enabling the cart to be built and assembled by the operator, one of the requirements of many competitions in this general field.

Another advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a partially exploded isometric view of the assembly.

FIG. 2 is an exploded view of the upper end portion of the steering shaft.

FIG. 3 is a partially cross sectioned side elevation of the assembled steering assembly enlarged in scale with reference to FIGS. 1 and 2.

FIG. 4 is a view along the line 4—4 of FIG. 3 and drawn to the same scale as FIG. 3.

In the drawings like characters of reference indicate corresponding parts in the different figures.

DETAILED DESCRIPTION

Proceeding therefore to describe the invention in detail, reference character 10 illustrates the main cross member which is preferably but not necessarily formed of a hollow rectangular configuration. Although it is shown in one piece, nevertheless it will be appreciated that, if desired, it can be made in a telescopic configuration so that the length thereof can be adjusted by the user, to suit the assembly to which it is being installed.

Bifurcated ends 11 are provided on the cross member 10 having upper and lower spaced and parallel plates 12 which are apertured as at 13 and ground engaging wheels 14 are provided to be mounted for rotation one upon each end of the cross member 10 as will hereinafter be described.

A steering column 15 is provided which is preferably hollow with a relatively small hub 16 being socketed within the upper end thereof and retained by means of a split pin 17 or any other conventional means, and a steering wheel (not illustrated) may be secured to this hub by means of nuts and bolt or the like through apertures 18.

A steering shaft guide is provided collectively designated 19 and is preferably formed from a relatively short length of tubing, one end of which is flattened as at 20 to form a bracket which may be secured to the securing member by means of screws or bolts 21. Although this bracket portion 20 is shown secured to the rear wall of the cross member 10, nevertheless it will be appreciated that it can be secured to the front wall under which circumstances the steering shaft may pass through an aperture within the cross member or alternatively, it may be secured to the upper or lower surfaces of the cross member, depending upon design paramaters.

The cylindrical portion 22 extends from the flattened portion 20 so that when it is secured to the cross member, it extends upwardly and rearwardly therefrom at an angle inclined from the vertical and transverse horizontal axes of the cross member, as clearly shown in FIGS. 1 and 3 and the inclined angle is important to the steering geometry.

An arcuate slot 23 is formed through the underside of the wall of the cylindrical portion 22 through an angle similar to that defined by the dotted lines 24 in FIG. 4, said angle being indicated by reference character 25 and it will be observed that this arcuate slot formed through the wall of the portion 22 is spaced downwardly from the upper end 22A of the portion 22. The lower end of the steering shaft 15 is socketed over the cylindrical portion 22 and a sleeve 25 engages over the lower end of the steering shaft and is screw threaded through the wall thereof as indicated by reference character 25A. A bolt shank 26 screw threadably engages through the sleeve 25 and engages through an aperture within the wall of the lower end of the steering shaft to engage within the arcuate slot 23 as clearly shown in FIGS. 3 and 4 and this threaded shank 26 forms the inner end of a pitman arm 27. The engagement of the inner end of the threaded portion 26, within the slot 23 firstly prevents displacement of the steering arm from the cylindrical portion 22, secondly limits the downward engagement of the steering arm with the cylindrical portion 22 and thirdly, controls the degree of turn in either direction, of the steering shaft and hence the degree of turning of the ground engaging wheels 14, it being understood that the bolt portion 26 engages the ends 23A of the slot 23 defined by the dotted lines 24. The bolt 26 is locked in position by means of locknut 26A.

The pitman arm 27 extends perpendicularly from the longitudinal axis of the cylindrical portion 22 and of course of the steering shaft 15 as clearly illustrated in FIG. 3 and this angular relationship relative to the rest of the steering assembly, is important to the correct functioning of the steering mechanism.

An I-loop 28 is formed on the distal end of the pitman arm 27, the plane of which is parallel to the transverse axis of the steering arm 15.

Connecting rods 29 and 30 are provided and extend one upon each side of the pitman arm. The connecting rod 29 is provided with a right angulated inner end 31 and this engages freely through the I-loop 28 so that the angulated end 31 lies substantially parallel to the longitudinal axis of the steering shaft 15.

A further I-loop 32 is formed on the inner end of the connecting rod 30 and this also engages over the angulated end 31 and lies above the I-loop 28 of the pitman arm as clearly shown in FIG. 3. Means are provided to retain the I-loops 28 and 32 upon the angulated end 31 and may take the form of a conventional cotter pin or a spring clip 33, well known in the art.

I-loops 34 and 35 are formed on the distal or outer ends of the connecting rods 29 and 30 respectively and the plane of these I-loops lies substantially parallel with the ground when installed.

Reverting back to the mounting of the wheels 14, a mounting component collectively designated 36 is provided at each end of the cross member 10 and in this embodiment these mounting members are shown as being cylindrical, but it will be appreciated that any configuration can be used.

A vertical bore 37 is formed through the mounting member and when the mounting member is engaged between the plates 12 of the bifurcated end 11 of the cross member, the apertures 13 align with the bore 37.

A steering arm collectively designated 38 is provided at each end of the cross member, said steering arm including a vertical king pin spindle portion 39 and a connecting rod engaging portion 40 extending substantially at right angles therefrom as clearly shown in FIGS. 1 and 3. The vertical king pin spindle portion engages through the lower plate 12, through the mounting member bore 37 and through the apertures 13 within the upper plate 11.

Means are provided to secure the mounting member to the king pin spindle 39 and also to secure the wheel to the mounting member. In this particular embodiment, which is the preferred construction, a screw threaded bolt 42 engages axially through the hub 43 of the wheel with the inner end of the bolt screw threadably engaging a transverse screw threaded bore 44 through the wall of the mounting member 36. The inner end of the bolt 42 engages against the king pin spindle portion 39 within the bore 37 and not only secures the wheel to the mounting member 36, but also clamps the wheel in the desired angular relationship with the king pin spindle portion 39.

Alternatively, the wheel may be bolted to the mounting member with a separate set screw being used to secure the mounting member to the vertical spindle portion 39.

A hooked end 45 is formed on the distal end of the connecting portion 40 of the steering arm 38 and this hooked end extends at right angles from the longitudinal axis of the portion 40 so that the plane of this offset hooked end lies perpendicular to the longitudinal axis of the portion 40 and the I-loops 34 and 35 freely engage this hooked end respectively as clearly shown.

The arc travelled by the pitman arm 27 when the steering shaft 15 is rotated, in conjunction with the mounted position of the steering arms, provides the necessary steering movement of both wheels with the inner wheel of the turn turning slightly more than the outer wheel which is desirable for good steering characteristics. Furthermore, the specific connection of the connecting rods to the steering arms and to the pitman arm permits the necessary up and down movement of the connecting rods as the steering is actuated yet at the same time prevents unnecessary play or clearance. The connection of the connecting members 36 to the king pin portions 39 permits the desired alignment of the wheels 14 with toe-in if necessary with the entire assembly providing the necessary rigidity required for this type of steering assembly.

Furthermore, the construction method prevents any jamming of the wheels occurring, a situation which often occurs with conventional steering mechanisms.

Although the closed I-loops and hooked end construction is illustrated and is preferable, nevertheless it will be appreciated that conventional ball joints may be used, but the cost of same is extremely high and is undesirable within the context for which the present steering assembly has been designed.

Finally, the device being available in kit form means that it can be stocked by the retailer in relatively small space because kits take up far less space than the assembled unit, is a distinct advantage to the retailer. Furthermore, many of the parts are standard size and threads and many of the details such as bolts, nuts, wheels and the like are already in stock for retailers that stock this type of item.

The steering tube 15 is preferably socketed over the portion 22 of the bracket, but it will be appreciated that other methods of attachment of this and the screw threaded portion 26 may be utilized.

The description and drawings show the pitman arm 27 and steering arms 40 in the downwardly and rearwardly location relative to the transverse support 10. However, it will be appreciated that the pitman arm can be situated on the front of the support with the steering arms extending forwardly, particularly for use with tongue type wagon steering or, the steering arms may be on the upper side of the supports with the bracket being positioned suitably when clearance below the frame is essential.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A front end steering assembly for carts and the like comprising in combination a transverse cross member, a ground engaging wheel mounted upon each end of said cross member, means to mount said wheels to said cross member, a steering arm operatively connected to each wheel and extending rearwardly of said cross member, a connecting rod extending from each steering arm towards the center of said cross member, a steering shaft, means mounting said steering shaft for axial rotation substantially centrally upon said cross member, said shaft extending upwardly and rearwardly from said cross member at an inclined angle relative to the central vertical axis of said cross member, a pitman arm connected to said steering shaft and extending downwardly therefrom normal to the axis thereof, means operatively connecting said connecting rods to said steering arms, and further means operatively connecting one connecting rod to the pitman arm and the other connecting rod to said one connecting rod, said means mounting said steering shaft upon said cross member including a steering shaft guide bracket secured substantially centrally of said cross member, said bracket including a cylindrical stem extending therefrom, an arcuate slot formed circumferentially in the wall of said stem and spaced downwardly from the distal end thereof, the lower end of said steering shaft being hollow and socketed over said distal end of said cylindrical stem for axial rotation thereon and a securing bolt screw threadably engaging through the wall of said hollow end and engaging within said arcuate slot thereby preventing displacement of said steering shaft from said stem, limiting the downward engagement of said steering column with said stem and limiting the degree of axial rotation of said steering shaft in either direction, said pitman arm forming part of and extending from said securing bolt.

2. The assembly according to claim 1 in which said means mounting said wheels to said cross member at each end thereof includes a mounting member at each end of said cross member, means journalling said mounting member to said cross member for partial rotation around a substantially vertical axis, one at each end of said cross member, and means to detachably secure one of said wheels for rotation, to each of said mounting members, said means journalling said mounting members to said cross members including each of said steering arms having a substantially vertical king pin portion and a connecting rod engaging portion extending substantially at right angles from one end of said king pin spindle portion, said king pin spindle portion being mounted for partial rotation one at each end of said cross member, said mounting member being detachably engaged and secured over said king pin spindle portion.

3. The assembly according to claim 2 in which each end of said cross member is bifurcated, said mounting member being situated within said bifurcated ends, said vertical king pin spindle portion engaging through said mounting member and through said bifurcated ends to mount said mounting member within said bifurcated ends.

4. The assembly according to claim 2 in which said means to detachably secure said wheels include a wheel bolt engaging axially through each said wheel and screw threadably engaging within the respective mounting member and adjustably clamping said mounting member to said vertical king pin spindle portion for selected radial relationship therebetween, thereby securing said wheels to said mounting members in the desired alignment with one another.

5. The assembly according to claim 3 in which said means to detachably secure said wheels include a wheel bolt engaging axially through each said wheel and screw threadably engaging within the respective mounting member and adjustably clamping said mounting member to said vertical king pin spindle portion for selected radial relationship therebetween, thereby securing said wheels to said mounting members in the desired alignment with one another.

6. The assembly according to claim 4 in which the inner end of said bolt engages said king pin spindle portion of said steering arm in clamping relationship within said mounting member thereby firstly, securing said wheel to said mounting member and secondly, clamping said vertical king pin spindle portion to said mounting member and thirdly, controlling the angular relationship of the axis of said wheel relative to said steering arm.

7. The assembly according to claim 5 in which the inner end of said bolt engages said king pin spindle portion of said steering arm in clamping relationship within said mounting member thereby firstly, securing said wheel to said mounting member and secondly, clamping said vertical king pin spindle portion to said mounting member and thirdly, controlling the angular relationship of the axis of said wheel relative to said steering arm.

8. The assembly according to claim 2 in which the connecting rod engaging portion between each steering arm and said connecting rod includes an offset hooked distal end formed on said connecting rod engaging portion and an I-loop formed on the outer end of the corresponding connecting rod freely engaged by said offset hooked end, the plane of said offset hooked end lying perpendicular to the longitudinal axis of said connecting rod engaging portion.

9. The assembly according to claim 3 in which the connecting rod engaging portion between each steering arm and said connecting rod includes an offset hooked distal end formed on said connecting rod engaging portion and an I-loop formed on the outer end of the corresponding connecting rod freely engaged by said offset hooked end, the plane of said offset hooked end lying perpendicular to the longitudinal axis of said connecting rod engaging portion.

10. The assembly according to claim 4 in which the connecting rod engaging portion between each steering arm and said connecting rod includes an offset hooked distal end formed on said connecting rod engaging portion and an I-loop formed on the outer end of the corresponding connecting rod freely engaged by said offset hooked end, the plane of said offset hooked end lying perpendicular to the longitudinal axis of said connecting rod engaging portion.

11. The assembly according to claim 5 in which the connecting rod engaging portion between each steering arm and said connecting rod includes an offset hooked distal end formed on said connecting rod engaging portion and an I-loop formed on the outer end of the corresponding connecting rod freely engaged by said offset hooked end, the plane of said offset hooked end lying perpendicular to the longitudinal axis of said connecting rod engaging portion.

12. The assembly according to claim 6 in which the connecting rod engaging portion between each steering arm and said connecting rod includes an offset hooked distal end formed on said connecting rod engaging portion and an I-loop formed on the outer end of the corresponding connecting rod freely engaged by said offset hooked end, the plane of said offset hooked end lying perpendicular to the longitudinal axis of said connecting rod engaging portion.

13. The assembly according to claim 7 in which the connecting rod engaging portion between each steering arm and said connecting rod includes an offset hooked distal end formed on said connecting rod engaging portion and an I-loop formed on the outer end of the corresponding connecting rod freely engaged by said offset hooked end, the plane of said offset hooked end lying perpendicular to the longitudinal axis of said connecting rod engaging portion.

14. The assembly according to claim 2 in which said further means operatively connecting one connecting rod to the pitman arm and the other connecting rod to said one connecting rod includes a substantially right angulated end formed on the inner end of said one connecting rod and lying substantially parallel to the axis of said steering shaft, an I-loop formed on the inner ends of said other connecting rod and on the distal end of said pitman rod, both freely engaging over said angulated end of said one connecting rod and means to detachably retain said I-loops on said angulated end.

15. The assembly according to claim 3 in which said further means operatively connecting one connecting rod to the pitman arm and the other connecting rod to said one connecting rod includes a substantially right angulated end formed on the inner end of said one connecting rod and lying substantially parallel to the axis of said steering shaft, an I-loop formed on the inner ends of said other connecting rod and on the distal end of said pitman rod, both freely engaging over said angulated end of said one connecting rod and means to detachably retain said I-loops on said angulated end.

16. The assembly according to claim 4 in which said further means operatively connecting one connecting rod to the pitman arm and the other connecting rod to said one connecting rod includes a substantially right angulated end formed on the inner end of said one connecting rod and lying substantially parallel to the axis of said steering shaft, an I-loop formed on the inner ends of said other connecting rod and on the distal end of said pitman rod, both freely engaging over said angulated end of said one connecting rod and means to detachably retain said I-loops on said angulated end.

17. The assembly according to claim 5 in which said further means operatively connecting one connecting rod to the pitman arm and the other connecting rod to said one connecting rod includes a substantially right angulated end formed on the inner end of said one connecting rod and lying susbstantially parallel to the axis of said steering shaft, an I-loop formed on the inner ends of said other connecting rod and on the distal end of said pitman rod, both freely engaging over said angulated end of said one connecting rod and means to detachably retain said I-loops on said angulated end.

18. The assembly according to claim 6 in which said further means operatively connecting one connecting rod to the pitman arm and the other connecting rod to said one connecting rod includes a substantially right angulated end formed on the inner end of said one connecting rod and lying substantially parallel to the axis of said steering shaft, an I-loop formed on the inner ends of said other connecting rod and on the distal end of said pitman rod, both freely engaging over said angulated end of said one connecting rod and means to detachably retain said I-loops on said angulated end.

19. The assembly according to claim 7 in which said further means operatively connecting one connecting rod to the pitman arm and the other connecting rod to said one connecting rod includes a substantially right angulated end formed on the inner end of said one connecting rod and lying substantially parallel to the axis of said steering shaft, an I-loop formed on the inner ends of said other connecting rod and on the distal end of said pitman rod, both freely engaging over said angulated end of said one connecting rod and means to detachably retain said I-loops on said angulated end.

20. The assembly according to claim 8 in which said further means operatively connecting one connecting rod to the pitman arm and the other connecting rod to said one connecting rod includes a substantially right angulated end formed on the inner end of said one connecting rod and lying substantially parallel to the axis of said steering shaft, an I-loop formed on the inner ends of said other connecting rod and on the distal end of said pitman rod, both freely engaging over said angulated end of said one connecting rod and means to detachably retain said I-loops on said angulated end.

21. The assembly according to claim 9 in which said further means operatively connecting one connecting rod to the pitman arm and the other connecting rod to said one connecting rod includes a substantially right angulated end formed on the inner end of said one connecting rod and lying substantially parallel to the axis of said steering shaft, an I-loop formed on the inner ends of said other connecting rod and on the distal end of said pitman rod, both freely engaging over said angulated end of said one connecting rod and means to detachably retain said I-loops on said angulated end.

22. The assembly according to claim 10 in which said further means operatively connecting one connecting rod to the pitman arm and the other connecting rod to said one connecting rod includes a substantially right angulated end formed on the inner end of said one connecting rod and lying substantially parallel to the axis of said steering shaft, an I-loop formed on the inner ends of said other connecting rod and on the distal end of said pitman rod, both freely engaging over said angulated end of said one connecting rod and means to detachably retain said I-loops on said angulated end.

23. The assembly according to claim 11 in which said further means operatively connecting one connecting rod to the pitman arm and the other connecting rod to said one connecting rod includes a substantially right angulated end formed on the inner end of said one connecting rod and lying substantially parallel to the axis of said steering shaft, an I-loop formed on the inner ends of said other connecting rod and on the distal end of said pitman rod, both freely engaging over said angulated end of said one connecting rod and means to detachably retain said I-loops on said angulated end.

24. The assembly according to claim 12 in which said further means operatively connecting one connecting rod to the pitman arm and the other connecting rod to said one connecting rod includes a substantially right angulated end formed on the inner end of said one connecting rod and lying substantially parallel to the axis of said steering shaft, an I-loop formed on the inner ends of said other connecting rod and on the distal end of said pitman rod, both freely engaging over said angulated end of said one connecting rod and means to detachably retain said I-loops on said angulated end.

25. The assembly according to claim 13 in which said further means operatively connecting one connecting rod to the pitman arm and the other connecting rod to said one connecting rod includes a substantially right angulated end formed on the inner end of said one connecting rod and lying substantially parallel to the axis of said steering shaft, an I-loop formed on the inner ends of said other connecting rod and on the distal end of said pitman rod, both freely engaging over said angulated end of said one connecting rod and means to detachably retain said I-loops on said angulated end.

* * * * *